(12) United States Patent
Hörig et al.

(10) Patent No.: US 11,079,328 B2
(45) Date of Patent: Aug. 3, 2021

(54) OPTICAL SENSOR

(71) Applicant: Endress+Hauser Conducta GmbH+Co. KG, Gerlingen (DE)

(72) Inventors: Alexander Hörig, Geringswalde (DE); Ronny Michael, Erlau (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 28 days.

(21) Appl. No.: 16/560,164

(22) Filed: Sep. 4, 2019

(65) Prior Publication Data

US 2020/0088636 A1 Mar. 19, 2020

(30) Foreign Application Priority Data

Sep. 14, 2018 (DE) .................. 10 2018 122 510.5

(51) Int. Cl.
*G01N 21/64* (2006.01)
*G02B 27/00* (2006.01)

(52) U.S. Cl.
CPC ......... *G01N 21/64* (2013.01); *G02B 27/0006* (2013.01); *G01N 2201/062* (2013.01); *G01N 2201/08* (2013.01)

(58) Field of Classification Search
CPC ............. G01N 21/64; G01N 2201/062; G01N 2201/08; G01N 2021/772; G01N 2021/7786; G01N 2021/157; G01N 21/7703; G01N 21/63; G01N 2121/151; G01N 2121/154; G02B 27/0006; G01D 5/34
See application file for complete search history.

(56) References Cited

U.S. PATENT DOCUMENTS

| | | | |
|---|---|---|---|
| 6,120,460 A * | 9/2000 | Abreu ................. | A61B 3/1241 600/405 |
| 2006/0284059 A1* | 12/2006 | Grot ..................... | G01N 21/774 250/227.14 |
| 2011/0080588 A1* | 4/2011 | Segall ................. | G01N 21/954 356/445 |
| 2017/0016825 A1* | 1/2017 | Machuca ............. | G01N 21/643 |

* cited by examiner

*Primary Examiner* — David P Porta
*Assistant Examiner* — Mamadou Faye
(74) *Attorney, Agent, or Firm* — Mark A. Logan; Endress+Hauser (USA) Holding Inc.

(57) ABSTRACT

The present disclosure relates to an optical sensor having a light source that emits light on a sensor layer, wherein the sensor layer can be brought into contact with a medium, wherein the first sensor layer emits emission light as a function of the incident light and a concentration of a measured value of the medium; a receiver, which receives the emission light; a first light guide, which conducts light from the light source onto a first region of the sensor layer and conducts emission light from the first region of the sensor layer to the receiver; and a second light guide independent of the first light guide which conducts light from the light source onto a second region of the first sensor layer and conducts emission light from the second region of the sensor layer to the receiver.

9 Claims, 1 Drawing Sheet

OPTICAL SENSOR

CROSS-REFERENCE TO RELATED APPLICATION

The present application is related to and claims the priority benefit of German Patent Application No. 10 2018 122 510.5, filed on Sep. 14, 2017, the entire contents of which are incorporated herein by reference.

TECHNICAL FIELD

The present disclosure relates to an optical sensor.

BACKGROUND

In the case of sensors, especially, optical sensors, contamination, which in the wastewater sector is called (bio-) fouling, of the sensor surface can lead to measured values being falsified over time or no further measurements being possible at all. This problem is very often encountered in the wastewater sector, in which case the user cannot tell whether the change in measured value is caused by the process or by fouling.

Coating the sensor surface provides a remedy to a certain extent. As a result, dirt or microorganisms can no longer accumulate so readily on the sensor. However, this coating can also affect the sensitive layer of the sensor and thus change measurement performance.

SUMMARY

The primary object of the present disclosure is to detect contamination of the sensor layer of a sensor.

This object is achieved by an optical sensor, comprising: at least one light source that emits excitation light in the direction of at least a first sensor layer; at least a first sensor layer, wherein the first sensor layer can be brought into contact with a medium, wherein the first sensor layer emits emission light as a function of the incident excitation light and a concentration of a measured variable of the medium; at least one receiver, which receives the emission light and converts it into a received signal, wherein a measured value for the measured variable can be generated from the emission light; a first light guide, which conducts excitation light from the light source onto a first region of the first sensor layer and conducts emission light from the first region of the sensor layer to the receiver; and a second light guide, which is independent of the first light guide and which conducts excitation light from the light source onto a second region of the first sensor layer and conducts emission light from the second region of the sensor layer to the receiver.

In one embodiment, the optical sensor comprises a first light source, especially, at least a first LED, and a second light source, especially, a second LED, wherein the first light guide conducts excitation light from the first light source to the first region of the sensor layer, and wherein the second light guide conducts excitation light from the second light source to the second region of the sensor layer.

In one embodiment, the optical sensor comprises a first receiver, especially, at least a first photodetector, and a second receiver, especially, a second photodetector, wherein the first light guide conducts emission light from the first region to the first receiver, and wherein the second light guide conducts emission light from the second region to the second receiver.

In one embodiment, the sensor comprises more than two regions.

In one embodiment, the first and/or second light guides comprise optical waveguides, fibers, especially, glass fibers, tubes or rods, especially, also in bundles, for conducting excitation light and emission light. In one embodiment, they comprise plastic waveguides, for example made of polycarbonate or a transparent silicone.

In one embodiment, the first and second regions are arranged concentrically or in two semicircles. In one embodiment, the regions are rectangular.

In one embodiment, the first region is the measurement region and the second region is the control or reference region. In this case, the actual measured value is determined from the first region, while the measurement from the second region serves for control purposes. If there is a difference between the two measurements, maintenance or at least inspection is necessary. In one embodiment, the second region surrounds the first region. Fouling usually takes place from the outside in.

In one embodiment, the sensor comprises a first sensor layer and a second sensor layer independent thereof, wherein the first region is arranged on the first sensor layer and the second region is arranged on the second sensor layer.

In one embodiment, the first and/or second light guide comprises a Y waveguide which conducts excitation light and/or emission light onto the first and/or second regions.

In one embodiment, the optical sensor comprises a cleaning device, especially, a compressed-air cleaning device or an ultrasonic cleaning device, which cleans the sensor layer.

In one embodiment, the sensor layer(s) is/are designed for measuring oxygen.

In one embodiment, the sensor comprises a housing which is substantially cylindrical with a diameter of approximately 40 mm, with the light source, receiver, light guide and sensor layer being arranged in the housing.

In one embodiment, the sensor takes the form of an explosion-protection sensor. The sensor can therefore be used in areas with an increased risk of explosion.

BRIEF DESCRIPTION OF THE DRAWINGS

This is explained in more detail with reference to the following figures.

DETAILED DESCRIPTION

In the figures, the same features are identified with the same reference symbols.

Figure 1:
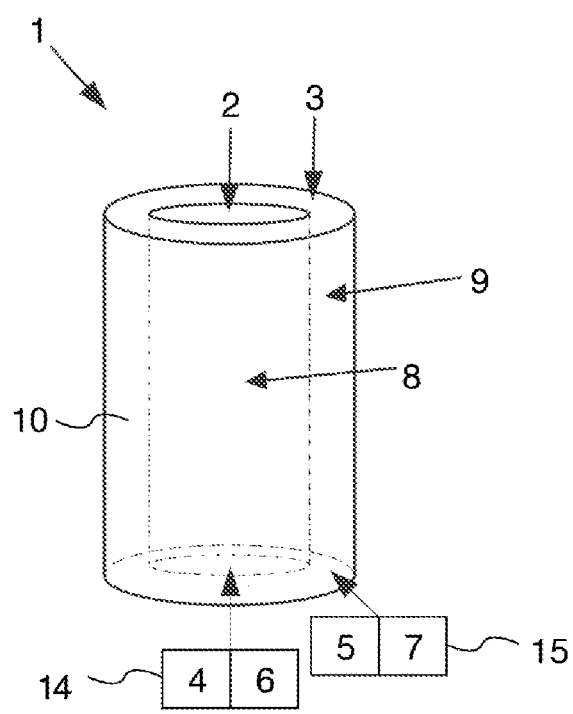
FIG. 1 shows the claimed optical sensor in a schematic overview from one side.

The entirety of the claimed optical sensor is denoted by reference symbol 1 and is shown in FIG. 1.

The sensor structure is briefly described below. By way of example, sensor 1 is designed for optically detecting oxygen concentrations. Other measured variables, such as CO2 and pH, are possible.

The sensor 1 comprises a housing which is cylindrical in shape. It has a diameter of approximately 40 mm. The material of the housing 10 is stainless steel or a robust plastic. The sensor 1 is used primarily in the wastewater sector.

In general, the sensor 1 comprises an optically active layer, the sensor layer 2, 3, which is configured, for example, as a luminescent layer, especially, as a fluorescent layer or a phosphorescent layer. The sensor layer 2, 3 comprises oxygen-sensitive molecules. The surface of the sensor layer 2, 3 is in contact with the medium 12 that is to be measured. The sensor optical system 14, 15, i.e., the light source 4, 5, receiver 6, 7, is directed toward the back end of the sensor layer 2, 3.

There is an equilibrium between the oxygen partial pressure in the medium 12 and that in the sensor layer 2, 3. When the sensor 1 is immersed in the medium 12, an equilibrium is established very quickly.

The sensor optical system 14, 15, specifically the light source 4, 5, emits pulses of green light (excitation light) into the sensor layer 2, 3. The oxygen-sensitive molecules in the layer 2, 3 "respond" (fluoresce, phosphoresce) with pulses of red light (emission light). The duration and intensity of the response signals are directly dependent on the oxygen content or oxygen partial pressure. If the medium 12 is oxygen-free, the response signals are long and of high intensity. Oxygen molecules mask the oxygen-sensitive molecules in the layer 2, 3. As a result, the response signals become shorter and of lower intensity. The response signals are received by the sensor optical system 14, 15, specifically by the receiver 5, 6, and converted into a corresponding signal.

The sensor 1 supplies a signal proportional to the oxygen concentration of the medium 12. The temperature of the medium 12 and the air pressure are taken into account in the sensor 1 in the calculation of the oxygen concentration. In addition to the variables of concentration, saturation index and partial pressure, the sensor 1 can also supply a raw measured value in time units.

The optical signals of the sensor 1 are continuously monitored and checked for plausibility. In the event of inconsistencies, an error message is generated. Error states, such as implausibly high or low measured values or faulty regulation due to erroneous measured values, are detected, for example. This is also the case if different values emerge from the measurement of the first and second regions 2, 3; see below.

FIG. 1 shows that the sensor 1 comprises a first light guide 8 and a second light guide 9. The first light guide 8 is independent of the second light guide 9. The sensor 1 comprises a first light source 4 and a second light source 5, which are directed at the first and second light guides 8, 9 respectively. The first and second light sources 4, 5 transmit light by means of the first and second light guides 8, 9 onto a first region 2 and a second region 3, respectively, of the sensor layer. As explained above, the incoming excitation light is converted into emission light according to the concentration. The emission light in turn arrives at the receivers 6, 7 via the light guides 8, 9.

Figure 2:
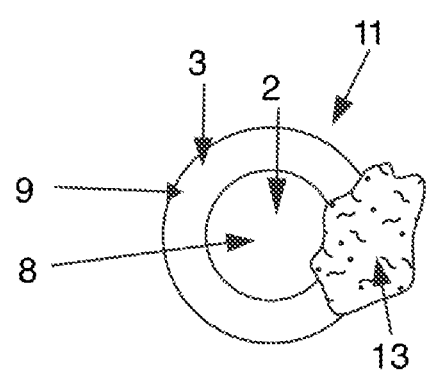
FIG. 2 shows the front end of the claimed optical sensor.

FIG. 2 shows the front end 11 of the sensor 1. A contamination 13 can be seen. Contamination frequently takes place from the outside in. Equipping the sensor 1 with a further transmission and reception path 8, 9, makes it possible to detect a change due to, for example, a contamination 13 in a light path. Contamination or a defect can be detected by alternating measurement and comparison of the measured values.

The middle region of the two regions, generally the first region 2, is used, for example, as the actual measurement channel, and the outer region, generally the second region 3, is used, for example, as the reference channel.

The first light guide 8 is shielded from the second light guide 9. No crosstalk occurs. In one development, the light guides 8, 9 are not shielded from each other. Accordingly, they are then measured one after the other and measurement signals from the second receiver 7 calculated during transmission from the first light source 4 (and vice versa).

In one development, the first and second regions 2, 3 of the sensor layer are arranged on a common sensor layer. In one development, the first and second regions 2, 3 are arranged on a first and on a second sensor layer, i.e. two different sensor layers.

The second region 3 is arranged concentrically around the first region 2. In one development, the regions are not arranged concentrically but next to each other.

The regions 2, 3 are annular; other shapes, such as rectangular, possibly also concentric, are conceivable. A design with two semicircles is also possible.

Two regions are illustrated, but several regions are also conceivable.

In one embodiment, only a single light source is used. In one embodiment, only a single receiver is used. Accordingly, a Y light guide is then used, which conducts light from the light source to the at least two regions. Accordingly, light is conducted from the sensor layers to the receiver by the Y light guide.

The light sources 4, 5 take the form of LEDs. The receivers 5, 6 take the form of photodetectors. The light guides 8, 9 are designed as optical waveguides, fibers, especially, glass fibers, tubes or rods, especially, also in bundles.

The sensor 1 further comprises a cleaning unit (not shown) which cleans the front end 11 of the sensor 1, for example at regular intervals or when deliberately initiated. The cleaning unit takes the form of, for example, a compressed-air cleaning unit or an ultrasonic cleaning unit. By means of the claimed sensor 1, it is possible to detect a contamination of the sensor layer 2, 3 and to clean it if such a contamination is detected.

The invention claimed is:

1. An optical sensor, comprising:
    at least one light source which emits excitation light in the direction of at least a first sensor layer;
    a first sensor layer embodied to contact a medium, wherein the first sensor layer emits emission light as a function of incident excitation light and a concentration of a measured variable of the medium;
    at least one receiver which receives the emission light and converts the emission light into a received signal, wherein a measured value for the measured variable can be generated from the emission light;
    a first light guide which conducts excitation light from the at least one light source onto a first region of the first sensor layer and conducts emission light from the first region of the first sensor layer to the at least one receiver; and
    a second light guide which is independent of the first light guide and conducts excitation light from the at least one light source onto a second region of the first sensor layer and conducts emission light from the second region of the first sensor layer to the at least one receiver.

2. The optical sensor according to claim 1,
    wherein the at least one light source includes a first light source including a first LED, and a second light source including a second LED,
    wherein the first light guide conducts excitation light from the first light source to the first region of the first sensor layer, and
    wherein the second light guide conducts excitation light from the second light source to the second region of the first sensor layer.

3. The optical sensor according to claim 1,
wherein the at least one receiver includes a first receiver including a first photodetector, and a second receiver including a second photodetector,
wherein the first light guide conducts emission light from the first region to the first receiver, and
wherein the second light guide conducts emission light from the second region to the second receiver.

4. The optical sensor according to claim 1,
wherein the first light guide and the second light guide include optical waveguides, fibers, glass fibers, tubes, or rods for conducting excitation light and emission light.

5. The optical sensor according to claim 1,
wherein the first region and the second region are arranged concentrically or in two semicircles.

6. The optical sensor according to claim 1, further comprising:
a second sensor layer independent of the first sensor layer, wherein the first region is arranged on the first sensor layer and the second region is arranged on the second sensor layer.

7. The optical sensor according to claim 1, further comprising:
a cleaning device, including a compressed-air cleaning device or an ultrasonic cleaning device, embodied to clean the first sensor layer.

8. The optical sensor according to claim 6,
wherein the first sensor layer and the second sensor layer are designed for measuring oxygen.

9. The optical sensor according to claim 1, further comprising:
a housing which is substantially cylindrical with a diameter of approximately 40 mm,
wherein the at least one light source, the at least one receiver, the first light guide, the second light guide, and first sensor layer are arranged in the housing.

* * * * *